Nov. 26, 1968  W. J. DE GAIN  3,412,628
SHOCK ABSORBING STRUCTURAL MEMBER
Filed July 14, 1966  3 Sheets-Sheet 1
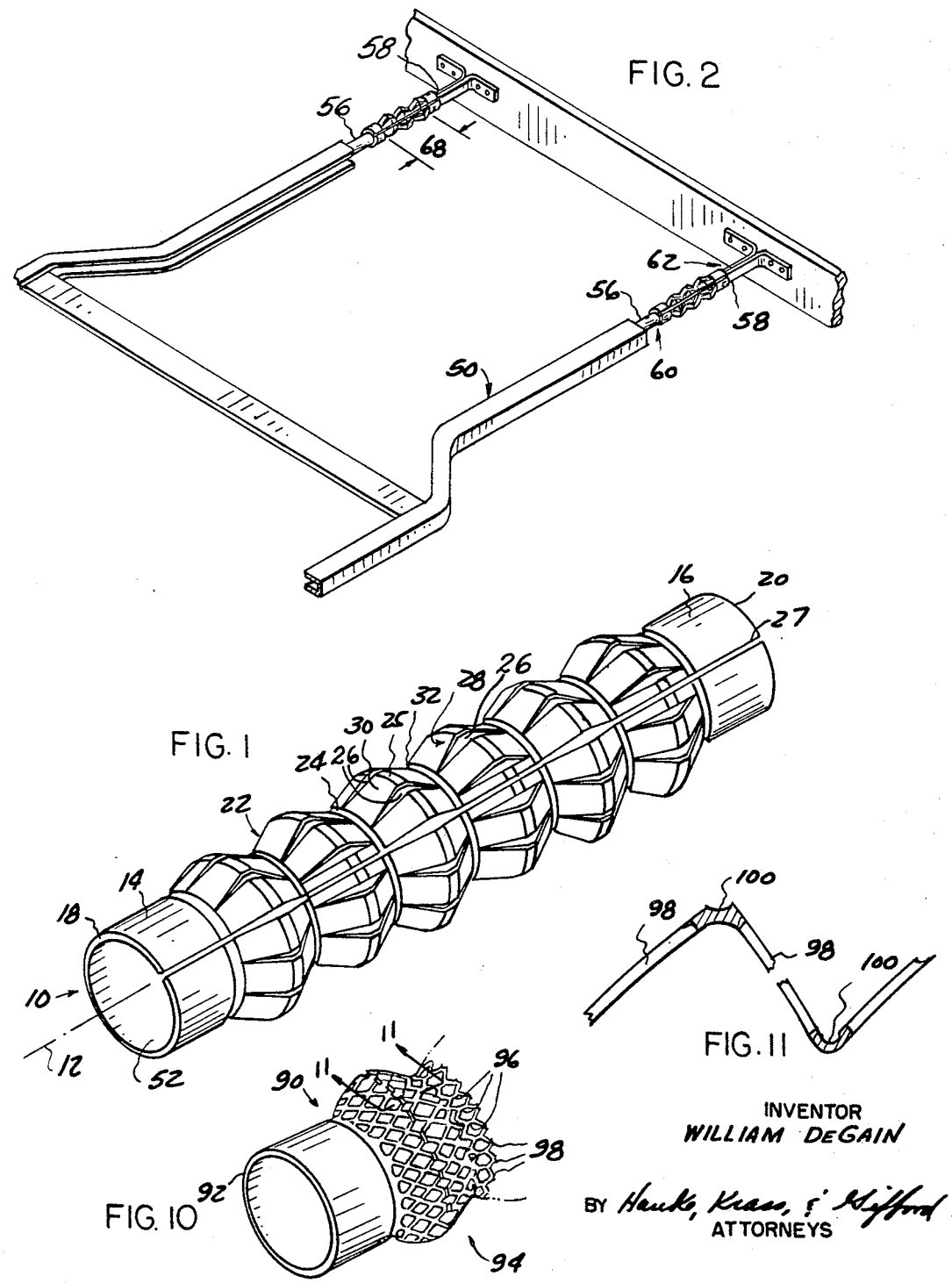
INVENTOR
WILLIAM DeGAIN
BY Hauke, Krass, & Gifford
ATTORNEYS INVENTOR
WILLIAM DeGAIN BY Hauke, Krass, & Gifford
ATTORNEYS Nov. 26, 1968 W. J. DE GAIN 3,412,628
SHOCK ABSORBING STRUCTURAL MEMBER
Filed July 14, 1966 3 Sheets-Sheet 3

INVENTOR
WILLIAM DE GAIN
BY Hauke, Knass, & Gifford
ATTORNEYS

United States Patent Office 3,412,628
Patented Nov. 26, 1968

3,412,628
SHOCK ABSORBING STRUCTURAL MEMBER
William J. De Gain, Detroit, Mich., assignor to Koppy Tool Corporation, Ferndale, Mich., a corporation of Michigan
Filed July 14, 1966, Ser. No. 565,223
10 Claims. (Cl. 74—492)

ABSTRACT OF THE DISCLOSURE

A structural member which is adapted to remain rigid when subjected to forces below a predetermined magnitude and to collapse and absorb energy when forces in excess of the predetermined magnitude are imposed on it, is formed of sheet steel and has an elongated tubular configuration. A series of regularly spaced radial rings of reduced thickness are disposed along the length of the tube and the tube is bent at the rings so that alternate rings are expanded to a larger diameter than the intermediate rings. Longitudinal slits or cut-outs extend across the outwardly expanded tube sections. The member is made by successively forming bends of decreased thicknesses at regular intervals along the tube; forming the slits, and outwardly expanding intermediate bands.

---

This invention relates to a shock absorber that structurally supports a substantial predetermined load and collapses to a predictable configuration when overloaded and more particularly to the use of shock absorbers to reduce the force of impact in a collision.

It is often desirable, such as when used in vehicles, that shock absorbers carry a portion of the structural load prior to impact.

It is an object of this invention to provide a structural stress carrying element that substantially rigidly supports a predetermined load prior to impact or collision, and after such impact, foreshortens a considerable distance in collapse.

It is another object of this invention to provide a structural load carrying element that carries a predetermined load prior to impact of collision, and collapses a considerable distance that is predetermined after such impact, and is readily detachable and disposable after the collision.

It is a further object of this invention to provide a structural stress carrying element in the structure of a vehicle that carries a predetermined load prior to impact of collision, collapses to a predictable length and configuration after collision, limits the transmission of deceleration forces caused by collision during collapse, is readily detachable and disposable after collision, and is capable of being easily and inexpensively manufactured while having an uncomplicated design.

It is a still further object of this invention to provide an uncomplicated and inexpensive method of making a structural element that is capable of carrying a predetermined structural load prior to impact, that collapses to a predetermined configuration after the impact of collision, and is readily removable and disposable after collision.

These and other objects are accomplished by a tubular structure having circumferentially aligned depressed grooves at uniform intervals on its exterior surface. Longitudinal openings formed are coaxially arrayed between certain of these grooves and across others. Every other groove is expanded outwardly from a central axis of the tubular structure. This expansion forms barrel-like portions that render a predetermined configuration of collapse of the tube when a sufficient axially directed load is applied to the tube. The openings or grooves provide a precisely predetermined thickness of a tubular structure where there is a minimum thickness of the structure. This predetermined minimum thickness together with the precise pattern and initial collapse configuration provides both the load carrying capabilities and predictable collapse configuration of the structural element.

Other objections of this invention will appear in the following description and appended claims, referring to the accompanying drawing forming a part of the specification.

In the drawings:

FIGURE 1 is a perspective view of a structural member of a preferred embodiment of this invention;

FIGURE 2 is a perspective view of the member shown in FIGURE 1 being employed in the structure of an automobile to provide support for bumpers;

FIGURE 10 is a perspective view of still another embodiment of the invention; and FIGURE 11 is a partial sectional view taken along line 11—11 of FIGURE 10.

Figure 3:
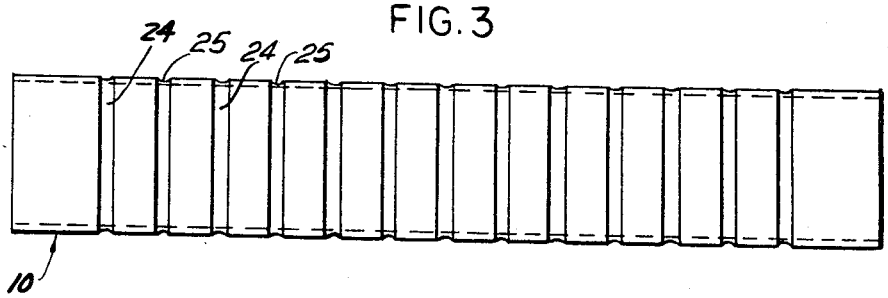
FIGURE 3 is a longitudinal view of an unfinished tubular member used in the preferred embodiment of this invention.

Before explaining the present invention in detail, it is to be understood that the invention is not limited in its application as to details of construction and arrangement of parts illustrated in the accompanying drawings since the invention is capable of other embodiments and of being practiced or carried out in various ways. Also, it is to be understood that the phraseology and terminology employed herein is for the purpose of description and not of limitation.

As shown in the drawings:

In FIGURE 1 there is shown a cylindrical steel tubular member 10 used in the preferred embodiment of this invention. The tubular member 10 has a central axis 12 extending longitudinally through the length of the member. Smooth right circular cylindrical portions 14 and 16 are located near ends 18 and 20, respectively, of the member 10. In between portions 14 and 16 are a plurality of outwardly bulging accordian-like or barrel-like portions 22. Each of these barrel-like portions 22 is bordered by annularly depressed grooves 24 peripherally or circumferentially impressed on the tubular member 10. Intermediate each of these grooves 24 and coextensive with the radially outwardmost portion of the barrel-like portions 22 are annularly depressed grooves 25 circumferentially impressed on the tubular member 10.

Each of the barrel-like portions 22 comprises bracket-like elements 28 disposed between pairs of slits 26 and the grooves 24. The grooves 25 are located at L-shaped junctions of portions 30 and 32 of the bracket-like members 28. In the preferred embodiment of this invention the portions 30 and 32 are raised at angles of approximately 25 degrees with respect to the central axis 12 of the cylindrical tubular member 10.

The grooves 24 and 25 are made in the exterior surface of the tubular member 10 so as to have a toroidal surface. In this manner, a smooth rounded surface is provided from points of maximum thickness 36 (FIGURE 5) towards points of minimum thickness 34 at the grooves 24, 25 of the tubular member 10. This gradual round and smooth regression is provided in order to prevent "stress risers," that is, to reduce interior sharp edges and discontinuities in the load carrying portions of the tubular member.

A longitudinal slot or aperture 27 (FIGURE 1) extending throughout the length of the tube 10 facilitates removal of the tube from the rest of the automotive structure after the tube collapses.

Referring again to FIGURE 2, there is shown an installation of the tubular member 10 into an automotive structure 50. The interior cylindrical surfaces 52 and 54 (FIGURE 5) near ends 18 and 20, respectively, elastically grip mating outer cylindrical surfaces 56 and 58, respectively, on structural extension members 60 and 62, respectively, of the automotive structure 50. Collars (not shown) on extension members 60 and 62, respectively, rigidly confine tubular member 10 within a predetermined distance between extension members 60, 62. When the tubular member collapses, members 62 and 60 come closer together by a distance 68 corresponding to the combined length of the barrel-like portions 22 on the tubular member 10.

During the normal operation of an automobile in which the present invention is employed, the tubular member absorbs a portion of the structural load impressed on the automobile. For example, when the tubular member 10 is utilized to provide support for bumpers on an automobile as shown in FIGURE 2, the load imposed on the tubular members by the weight of the bumpers is not sufficient to cause significant extension or collapse of the tubular members 10. Even loads imposed on the bumper due to "gentle" nudging during parking, or during the pulling of trailers, will not cause undue extension or collapse of the tubular members 10.

However, when a load is imposed beyond a predetermined limit, collapse of these members will occur in a direction along longitudinal axis 12. The barrel-like portions 22 will bend out further so that the grooves 24 will come toward each other and portions 14 and 16 of the tubular member will move toward each other and be separated by a distance substantially less than that prior to collision. The grooves 25 at the outer extremity of the barrel-like portions 22 will extend further outwardly as the tubular member collapses, but not beyond a distance indicated by the length of portions 30 and 32 of the bracket-like portions. In this manner, a predictable configuration of collapse is achieved.

When collapsed, the slot 27 is widened to facilitate removal of the collapsed tube.

The force of impact immediately prior to collapse is greater than the force generated by impact at the end of collapse of the tubular member which is ultimately transmitted from the bumpers to other portions of the automobile.

This result can be appreciated from fundamental physics involved in the collision of an automobile. This is discussed on pages 551–558 in a book entitled Mechanics Vol. II Dynamics by J. L. Meriam of the University of California, a noted authority on mechanics. It is also discussed in an older work, Theoretical Mechanics, by Alexander Ziwet, of the University of Michigan, on pages 1–17 of vol. 3. The force generated on impact integrated over the time of impact is equal to the change of momentum of an object during that time. In symbolic form this reduces to:

$$Fdt = mv$$

F is force, $dt$ is differential time, mass is represented by $m$, and velocity is represented by $v$.

From the above relation it can be appreciated that if the time of impact is increased, the force is necessarily decreased for a given change of momentum. Differentiating the above equation, it can be appreciated that the change of momentum divided by time is equal to deceleration on an object when it is stopped by collision.

$$F = m\frac{dv}{dt}$$

It thus can be appreciated that by designing a tubular member 10 used in the embodiment of this invention to a predetermined minimum thickness 34, a predetermined deceleration for a given mass can be used as an upper limit on the load carrying capability of the tubular member. Thus, if such an element were to be used as a tubular housing for steering wheel of an automobile, a maximum impact exerted on the driver can be precisely determined by the practice of this invention.

When collapsed, the barrel-like portions of the tubular member 10 are bent outwardly, so that bracket portions 30 and 32 are close to being parallel. This results in a configuration in which the barrel-like portions fold together like an accordian, thus reducing the distance between the cylindrical end portions 14 and 16 by an amount substantially equal to the length of the barrel-like portions prior to collapse. This reduction of distance is especially valuable in preventing the steering wheel shaft from injuring the driver when the present invention is employed in the steering wheel shaft and enclosures assembly as discussed above.

Figure 7:
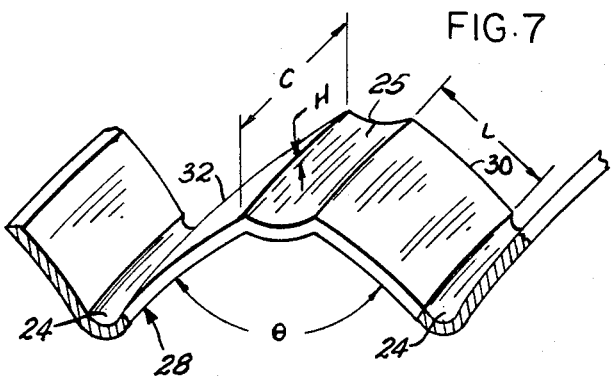
FIGURE 7 is a partial sectional view of a portion of the member shown in FIGURE 1.
Figure 8:
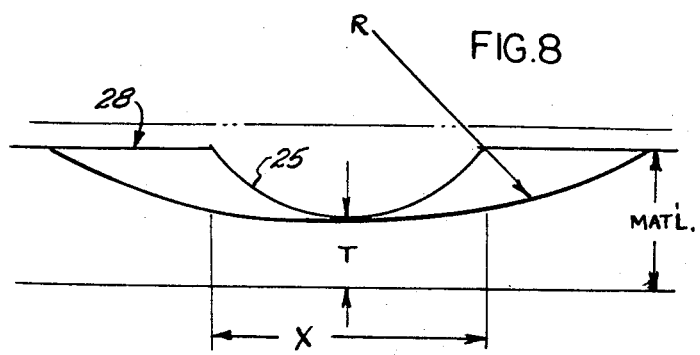
FIGURE 8 is a partial sectional view of the portion of the member shown in FIGURE 7.

Referring to FIGURE 7, there is shown one of the bracket or hinge-like elements 28 of the barrel-shaped portions of a preferred embodiment of the structural member used in the practice of this invention. In FIGURE 8, there is shown a fragmentary cross-section of the hinge-like element 28 at the groove 25 joining the portions 30 and 32. The letter L refers to the length of the portions 30, 32. The letter $\theta$ indicates the angle between the portions 30, 32. The letter T refers to the minimum thickness of the common groove 25 between the portions 30, 32. The letter R refers to the radius of curvature of the common groove 25. The letter X refers to the width of the groove 25 having a thickness substantially equal to the minimum thickness T. X also corresponds to the length of the useful beam segment parallel to the direction of force applied to the structural member. The letter C refers to the chord length of arcuate portions 30, 32 of the hinge-like element 28 in the preferred embodiment of the structural member. The chord length corresponds to the width of the portions 30, 32. The letter H refers to the mount of the arc displacement from the corresponding point on the chord (shown as a dashed line) of the portions 30, 32 of the hinge-like element 28.

The strength of the hinge-like elements 28 is a function of the parameters referred to in the above paragraph. Generally, the greater the angle $\theta$, the thickness T, the maximum arcuate displacement H, the length of the chord C, the lesser the radius distance R, and the lesser the distance, the greater will be the force F which the hinge-like elements 28 can support before collapse. A member with hinge-like elements 28 indicated in FIGURES 7 and 8 can be rolled or coined to produce a constant material thickness T at groove 25 in combination with segments L performed to an angle $\theta$ arranged to collapse in a hinge-like motion with a predetermined force along the lines of action indicated by vectors F. The combination of the radius R and wall thickness T determines the cross-sectional strength of the hinge-like portion 28 at the groove 25. The angle $\theta$ will determine the proportion of the structural load carried by the portions 30, 32 indicated by the length L as components of such load carrying capacity in the direction of the force along the lines of action indicated by the vectors F. The greater the height H of the zenith of the arc over the corresponding chord the greater will be the structural load carrying capacity. By controlling each of the above discussed parameters, a precise determination of the structural load carrying capacity of the hinge-like elements 28 and hence of the tubular member 10 of which the hinge-like elements 28 are a part, can be precisely predicted.

Figure 9:
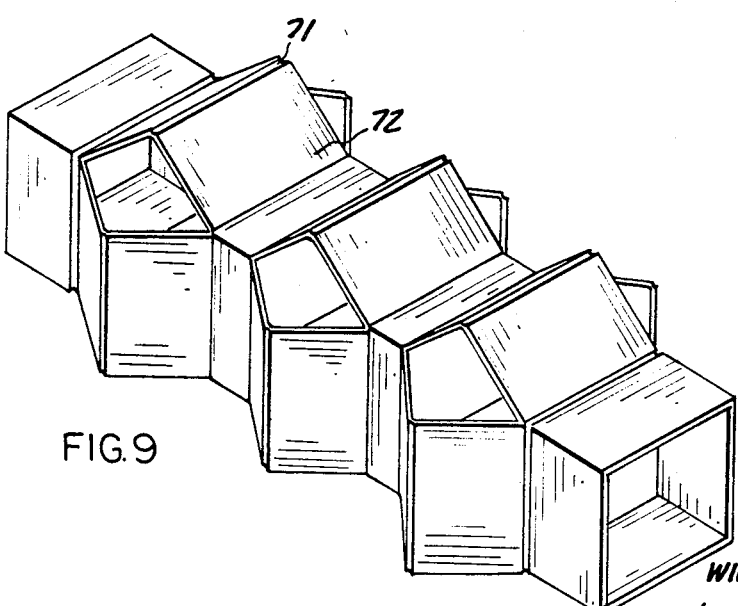
FIGURE 9 is a perspective view of an alternate embodiment of this invention.

Referring to FIGURE 9 there is shown an alternative embodiment of a structural member used in the practice of this invention. Grooves 71 are provided on hinge-like portions 72 at the peripheral sections of the box-like or parallel piped-like tube. At the grooves, areas of minimum thickness are precisely determined in a manner analagous to that of the cylindrical tube. The structural member is formed into accordian-like or barrel-like portions to form a predetermined pattern, which together with the predetermined areas of minimum thickness provide a predictable collapsed configuration at a predetermined load.

In addition to the alternative embodiment shown of parallelepiped or accordian-like configuration (in FIGURE 9) as well as the preferred cylindrical barrel-like configuration (FIGURE 1), a variety of other shapes of tubes can be formed into accordian-like configuration having predetermined areas of minimum thickness. These alternative embodiments, as well as the preferred embodiment, can, by the practice of this invention, provide structural load carrying capacity up to a predetermined limit and a predictable collapsed configuration when loads are imposed beyond that limit.

Figure 4:
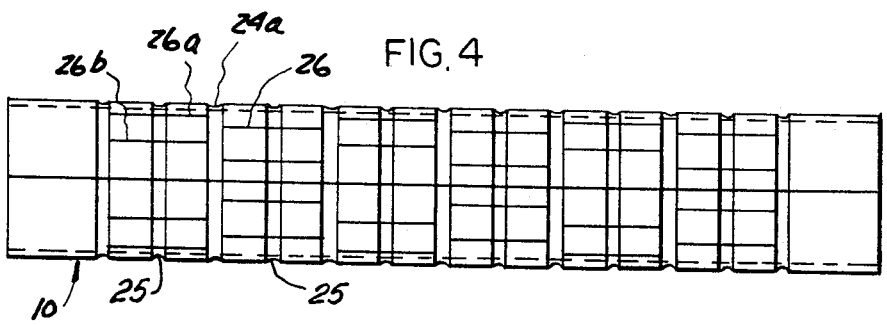
FIGURE 4 is a longitudinal view of the tubular member of FIGURE 3 after a successive step in processing it into the preferred embodiment of this invention.
Figure 5:
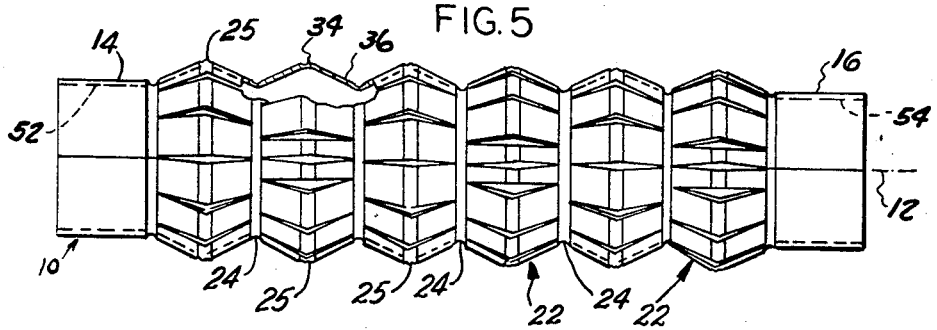
FIGURE 5 is a longitudinal view of the tubular member of FIGURE 4 after a further successive step in the processing of the member into a preferred embodiment of this invention.
Figure 6:
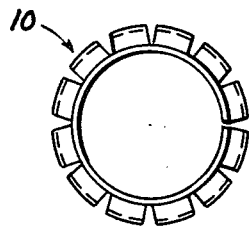
FIGURE 6 is a cross-sectional view of the member shown in FIGURE 5.

FIGURES 3, 4 and 5, illustrate successive steps in a method of making the above article, with the first step including insertion of a mandrel inside a circular tube 10. A circular edged tool is spaced at predetermined uniform intervals along the exterior surface of the tubular member 10 to impress the annular grooves 24, 25 in the tube. This results in a predetermined thickness within close tolerance in the annular grooves 24, 25 or depressions in the tubes.

FIGURE 4 illustrates slits 26 punched at uniform circumferentially spaced intervals between the annular grooves or depressions 24, 25. They are preferably formed by lancing the tube 10 against a mandrel used as a die. As shown, slits 26A and 26B extending from the annular groove 24A are spaced away from the slit 26 on the other side of a groove 24A. By this design, an accidental extending the the slit beyond the annular groove 24A will not connect with another slit bordering on it. This insures a controlled load carrying capability in the tubular member 10.

In FIGURE 5 successive annular grooves 25 are pushed outwardly by an arbor or other appropriate tool. They are spaced between annular grooves 24 so as to form the series of barrel-like extending portions 22, between the untreated exterior cylindrical surfaces 14 and 16 respectively of the tubular member.

After the barrel-like portions 22 are formed, the tube is heat treated to desirable stress characteristics. Preferably, annealing and sizing are performed in order to precisely calibrate longitudinal axis direction stress to a predetermined lower limit before the barrel-like portions of the tube will collapse.

FIGURES 10 and 11 illustrate another embodiment of the invention consisting of a tube generally indicated at 90 having an end fitting 92 and a collapsible section generally indicated at 94 formed of a perforated metal. The collapsible section has diamond shaped cut-outs 96, replacing the slits of the previous embodiment and leaving relatively thin ribs 98. At regular intervals circumferential grooves 100 are formed about the tube by rolling the sections. Bends are formed at these grooves 100 so as to corrugate the tube and raise alternate of the grooves to a greater than the central diameter of the tube. Since the thickness of the grooves 100 is rolled to a known thickness, and is afterward annealed to produce a known metallurgy, the collapse strength of the tube may be easily calculated. The tube collapses into a known configuration so that the rate of collapse and of energy absorption for a given impact may be easily calculated.

From the above specification, it can be appreciated that an uncomplicated, inexpensive method has been provided for making an article that can be used as a structural element in carrying a predetermined load in an automobile prior to collision, and reducing the force of impact subsequent to collision by collapsing to a predetermined configuration along a longitudinal direction, and that can be readily disposed of after collision and replaced by similar inexpensive embodiment of this invention.

I claim:

1. A member adapted to transmit loads imposed upon it which are below a predetermined level, and to collapse in a uniform manner and absorb energy when a load in excess of said predetermined level is imposed upon it, comprising:

An elongated tubular member formed of sheet metal having a first thickness and having end portions adapted to connect to other structural members;

a plurality of fully circumferential rings of a second thickness, less than the first thickness, formed along the length of the tubular member between its ends; and bends formed in the member at each of the circumferential rings about lines lying in planes generally normal to the longitudinal axis of the tubular member, whereby the cross sections of at least certain of the rings differ from the normal cross section of the tube.

2. The member of claim 1 wherein the normal cross section of the tube is circular and the bends result in cross sections of said certain of the rings have a diameter which differs from the normal tube diameter.

3. The member of claim 1 wherein the bends are formed in alternate rings in different directions so that the longitudinal cross sections of the sidewalls between the bends incline with respect to the longitudinal axis of the tube and the cross sections at alternate rings have differing diameters.

4. The member of claim 3 wherein alternate rings are disposed at a greater diameter than the normal diameter of the tube.

5. The member of claim 1 wherein longitudinally aligned separations are formed in the tube, with each separation extending across one ring, and terminating short of the two rings bounding such one ring.

6. A member adapted to transmit loads imposed upon it which are below a predetermined level and to collapse in a uniform manner and absorb energy when a load in excess of said predetermined level is imposed upon it, comprising:

an elonated tube of sheet steel having a first thickness and a circular cross section;

end portions on said tube adapted to connect to other structural members;

a plurality of fully circumferential rings of a second thickness, less than said first thickness, formed at regular intervals along the tube, between its ends; and bends formed in the tube at each of the rings about lines lying in planes normal to the longitudinal axis of the tube, such bends being in a first direction with respect to the longitudinal axis of the tube at every other ring, and in the opposite direction at the intermediate rings, whereby the tube sections connecting successive rings are inclined with respect to the longitudinal axis of the tube, and adjacent sections are inclined in opposite directions, whereby certain of the rings have a greater diameter than the other rings, and whereby said tubular member is substantially rigid for a predetermined structural load and collapses by at least certain of the rings moving away from the normal diameter of the tube, thereby absorbing energy in the bending, upon the load exceeding said predetermined level.

7. The member of claim 6 wherein longitudinally extending separated sections are formed across certain of the rings, and terminate short of the two rings bounding each such ring.

8. The member of claim 7 wherein the longitudinally extending separated sections comprise slits formed in the tubing.

9. The member of claim 8 wherein an odd number of rings are formed and every second ring, beginning with the end rings, has a diameter equal to the normal diameter of the tubing and rings between these have a diameter greater than the normal diameter of the tubing.

10. The member of claim 6 wherein the member forms a part of an enclosure for the steering wheel shaft of an automobile with one end portion of the tube attached to a shell enclosing the upper portion of the steering wheel shaft and the other end of the tube attached to a shell enclosing the lower portion of the steering wheel shaft, whereby force exerted on said steering wheel shaft in excess of a predetermined limit results in the collapse of said tube and said tube collapses in a predetermined configuration through a predetermined distance.

References Cited

UNITED STATES PATENTS

| | | | |
|---|---|---|---|
| 2,785,775 | 3/1957 | Stevinson. | |
| 2,870,871 | 1/1959 | Stevinson | 188—1 |
| 2,927,953 | 3/1960 | Staller. | |
| 2,973,172 | 2/1961 | Bixby | 188—1 X |
| 3,235,276 | 2/1966 | Leonard | 174—135 |
| 3,307,868 | 3/1967 | Blank | 188—1 X |
| 3,313,567 | 4/1967 | Sturman | 188—1 X |
| 3,364,785 | 1/1968 | Geller | 74—552 |
| 3,373,629 | 3/1968 | Wight et al. | 74—492 |
| 3,373,630 | 3/1968 | Heurtebise | 74—492 |
| 1,496,112 | 6/1924 | Banschbach | 180—92 |
| 1,813,039 | 7/1931 | Escol | 138—121 |
| 2,663,324 | 12/1953 | Fentress | 138—121 |
| 2,707,492 | 5/1955 | Harris et al. | 138—122 |
| 2,752,172 | 6/1956 | Ziebold | 138—121 |
| 3,167,974 | 2/1965 | Wilfert | 74—522 |
| 3,270,581 | 9/1966 | Geller | 74—492 X |
| 3,313,319 | 4/1967 | Osborn et al. | 138—121 |

FOREIGN PATENTS 932,027   7/1963   Great Britain.

OTHER REFERENCES

"Safety British Steering," Autocar, p. 850, Apr. 29, 1966, vol. 124, #3663.

FRED C. MATTERN, JR., *Primary Examiner.*

C. F. GREEN, *Assistant Examiner.*